United States Patent [19]

Hosage

[11] Patent Number: 4,993,672
[45] Date of Patent: Feb. 19, 1991

[54] SAFETY RETAINER FOR MODEL AIRPLANES

[76] Inventor: Fred G. Hosage, 174 Tree Rd., Centereach, N.Y. 11720

[21] Appl. No.: 481,269

[22] Filed: Feb. 20, 1990

[51] Int. Cl.$^5$ .............................................. A45F 3/44
[52] U.S. Cl. ................................ 248/156; 244/110 R; 446/34
[58] Field of Search .................. 248/156; 244/110 R, 244/110 C, 110 A, 63, 19 D; 104/257; 188/36; 446/34

[56] References Cited

U.S. PATENT DOCUMENTS

| | | | |
|---|---|---|---|
| 1,158,705 | 11/1915 | Maxwell | 188/36 |
| 1,604,024 | 10/1926 | Crass | 188/36 |
| 2,712,912 | 7/1955 | Hattan | 244/110 C |
| 2,844,340 | 7/1958 | Daniels | 244/110 C |
| 2,872,136 | 2/1959 | Cotton et al. | 244/110 C |
| 3,084,475 | 4/1963 | Sunray | 446/34 |
| 3,232,564 | 2/1966 | Benson | 446/34 X |
| 3,869,104 | 3/1975 | Gallo | 244/110 C |
| 4,169,333 | 10/1979 | Clair | 446/34 |
| 4,674,929 | 6/1987 | Blunden | 188/36 X |

Primary Examiner—J. Franklin Foss
Attorney, Agent, or Firm—Leonard Belkin

[57] ABSTRACT

Safety restraining apparatus for a model airplane under power comprising an inverted U-shaped member having a hinged member mounted on the top. The hinged member consists of a pair of spaced arms and legs which limit motion of the hinged member to one direction when the U-shaped member is inserted into the ground. The aircraft with propeller turning is restrained by the hinged member coming into contact with the horizontal stabilizers. The aircraft is released for take off by withdrawing the airplane permitting the hinged member to drop to ground under gravity to be out of the way. One advantage of this invention is that the arms drop out of the way when the airplane is withdrawn. Another advantage of this design is that once the device is mounted in the ground it can be reused any number of times without removing it from the ground. Thus, for a full day of flying, for example, the device is installed, used repeatedly, and then removed when the equipment is to be put away and the area is left.

10 Claims, 1 Drawing Sheet

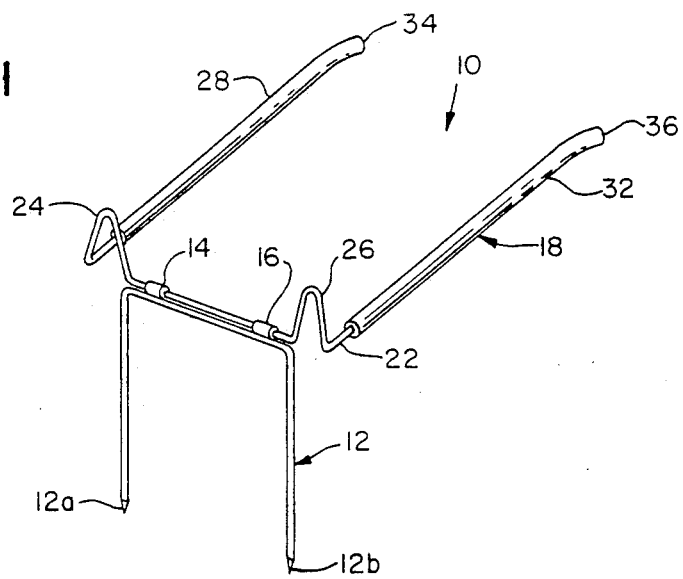
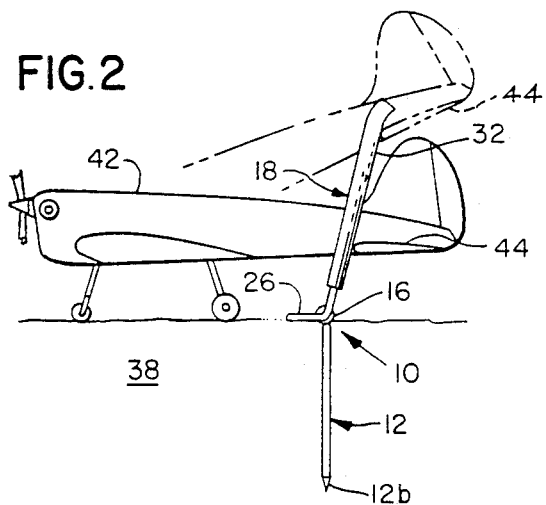
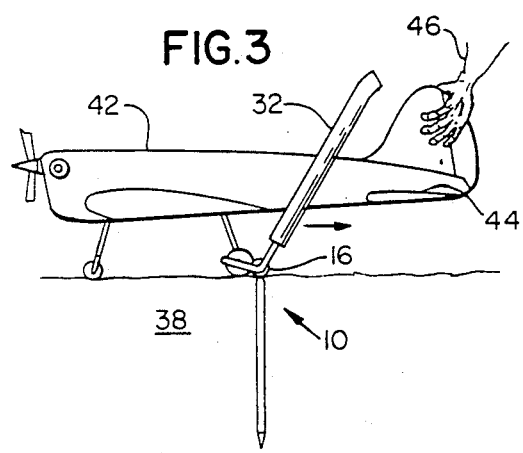
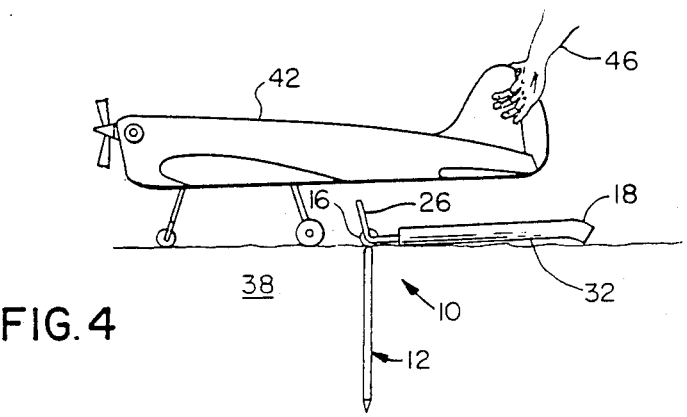

SAFETY RETAINER FOR MODEL AIRPLANES

BACKGROUND OF THE INVENTION

This invention relates to a model airplane safety device and more particularly to a device for safely positioning a model airplane at or during start up and prior to take off.

A recent news item including a photograph which appeared in a publication directed to the model airplane enthusiast showed an individual whose hand had been repaired with 59 stitches. The hobbyist or pilot was attempting to start his aircraft by himself and his fingers were caught in the rapidly spinning (i.e., 8,000-10,000 rpm, at full throttle for launching) prop.

Model airplanes are generally controlled remotely by a radio transmitter. After the engine is started, getting the plane ready for flight involves holding the plane back while removing the electric starter, adjusting the throttle with the transmitter, and reaching around the turning prop to remove the glow plug energizer.

This procedure followed by a pilot without any assistance from another person is recognized as so dangerous that it is virtually forbidden for the hobbyist to launch a model airplane by himself.

A number of safety devices have been proposed for use by the hobbyist. One of them utilizes a U-shaped metal rod which is inverted and placed over the rear fuselage in front of the horizontal stabilizer and pushed into the ground. The big problem is in removing the rod while holding the plane to keep it from taking off. Another problem is the need to insert it into the ground for each takeoff.

SUMMARY OF THE INVENTION

In this invention there is provided a safety device for restraining a model airplane about to be started which eliminates the problems associated with other safety devices and also has other advantages.

A preferred embodiment of this invention comprises an inverted U-shaped member having a hinged member mounted on the top. The hinged member consists of a pair of spaced arms and legs which limit motion of the hinged member to one direction when the U-shaped member is inserted into the ground. The airplane with propeller turning is restrained by the hinged member coming into contact with the horizontal stabilizers. The airplane is released for take off by being pulled in reverse to taxi and permitting the hinged member to pivot out of the way.

One advantage of this invention is that the device drops out of the way by itself when the airplane is removed from contact. Another advantage of this invention is that once the device is mounted in the ground it can be reused any number of times without removing it from the ground. Thus, for a full day of flying, for example, the device is installed, used repeatedly, and then removed when the equipment is to be put away and the area is left.

It is thus a principal object of this invention to provide a safety device for starting and running up model airplanes which is easy to use and install, reliable, and economical in construction.

Other objects and advantages of this invention will hereinafter be obvious from the following detailed description of a preferred embodiment of this invention.

BRIEF DESCRIPTION OF THE FIGURES

FIG. 1 is an isometric view of a preferred embodiment of this invention.

FIG. 2 is an elevation view of the preferred embodiment mounted for use in restraining a model airplane.

FIG. 3 is an elevation view of the device shown in FIG. 2 in the process of removing the airplane from the restraining device to release the airplane for takeoff.

FIG. 4 shows the aircraft about to be released.

DETAILED DESCRIPTION OF THE PREFERRED EMBODIMENT

Referring to FIG. 1, safety retainer 10 consists of an inverted U-shaped ground member 12 typically of metal construction on which is mounted rigidly a pair of hinges 14 and 16. Ground member 12 has a pair of prongs with pointed tips 12a and 12b. Hinges 14 and 16 support for rotation a restraining member 18 constructed out of a generally U-shaped rod 22 passing through hinges 14 and 16 in the manner illustrated and forming a pair of loops or legs 24 and 26, and extended arms 28 and 32 which are parallel to and spaced from each other.

The angle between legs 24, 26 and arms 28, 32 is slightly in excess of 90 degrees for reasons to be noted below. Also, arms 28 and 32 are provided with sleeves 34 and 36, respectively, of suitable material such as rubber or soft plastic to prevent damage to the portion of the airplane where contact is made as will be explained below. In addition, the tips or ends of arms 28 and 32 are hooked or curved slightly away from legs 24 and 26 (for reasons which will be explained).

For the manner in which safety retainer 10 is employed, reference is made to FIGS. 2-4.

As seen in FIG. 2, ground member 12 is inserted into ground 38 until hinges 14 and 16 are substantially flush with the ground surface. Arms 28 and 32 are rotated until they are substantially upright, legs 24 and 26 coming into contact with the ground surface and preventing any further counter clockwise rotation of legs 24 and 26. It will be noted that the angle between arms 28, 32 and legs 24, 26 is such that when retainer 10 is installed as illustrated, arms 28 and 32 will be slightly off center so that in the absence of support, restraining member 18 will rotate clockwise toward the ground surface under the influence of gravity.

Airplane 42 is then placed on the ground in position for starting with its fuselage between arms 28 and 32. With its engine and propeller running, further movement of airplane 42 is prevented by the front edges of its horizontal stabilizers 44 being in contact with upright arms 28 and 32, the thrust developed by the prop maintains arms 28 and 32 upright. Airplane 42, even though its propeller is rotating at full throttle, can be left unattended in this position while the hobbyist can attend to other matters in preparation for the flight, for example, adjusting the throttle, removing the glow plug energizer, testing the controls, etc.

When airplane 42 is ready to released for flight, the hobbyist with one hand 46 can retract airplane 42 to the right, as seen in FIG. 3, permitting arms 28 and 32 to rotate clockwise, dropping to the ground surface as shown in FIG. 4, getting out of way of model airplane 42. The hobbyist then can rotate plane 42 to take off in any direction desired.

A function of the hook ends of arms 28 and 32 is to prevent horizontal stabilizers 44 from accidentally rising up and over restraining device 18 due to a gust of wind or other unforseen event. As seen in FIG. 2, the hooked ends of arms 28 and 32 catch stabilizers 44 and prevent this from occurring.

It is thus seen there has been provided a simple and inexpensive, yet highly effective and reliable safety device useful to restrain powered model airplanes in preparation for take-off.

While only a preferred embodiment of this invention has been described it is understood that many variations are possible without departing from the principles of the invention a defined in the claims which follow.

What is claimed is:

1. Model airplane restraining apparatus comprising support means for insertion into the ground until the top of said support means is substantially at ground level, hinge means rigidly mounted on the top of said support means, restraining means mounted on said hinge means for rotation, said restraining means comprising an element engaged with said hinge means, a pair of spaced, extended parallel arms perpendicular to said element, and leg means making an angle with said arms sufficiently in excess of 90 degrees so that when said leg means is substantially horizontal and in contact with ground surface said restraining member will tend to rotate under the influence of gravity, said angle being sufficiently close to 90 degrees so that when said leg means is in contact with ground said parallel arms are sufficiently upright to block forward movement of said airplane, whereby said plane may be withdrawn from contact with said restraining member using one hand permitting said restraining member to drop to the ground and out of the way of said airplane.

2. The model airplane restraining apparatus of claim 1 wherein said support means comprises a pair of pointed rods for insertion into said ground.

3. The model airplane restraining apparatus of claim 2 wherein said parallel arms are provided with sleeves of soft material to prevent damage to said airplane where said arms come into contact with said airplane.

4. The model airplane restraining apparatus of claim 3 wherein said restraining means is constructed out of a single length of rod-like material bent to form said leg means and said arms.

5. The model airplane restraining apparatus of claim 4 wherein said parallel arms have free ends which are hooked to catch said airplane when the tail thereof rises.

6. The method of restraining a model airplane from movement when powered comprising the steps of inserting restraining apparatus into the ground, said restraining apparatus comprising support means, hinge means rigidly mounted on the top of said member, a restraining support means mounted on said hinge means for rotation, said restraining member comprising an element engaged with said hinge means, a pair of spaced, extended parallel arms perpendicular to said element, and leg means substantially perpendicular to both said parallel arms and said element for limiting rotation of said arms between a position in contact with said ground surface and a substantially vertical position to block forward movement of said model airplane, said arms in the vertical position being at a slight angle away from vertical to permit said restraining member to rotate to the ground surface under the influence of gravity but small enough to insure that said arms in an upright position will be capable of blocking forward movement of said airplane, inserting said support means into said ground until said hinge means just appears above said ground surface, raising said arms to a the upright position with said leg means in contact with ground level, placing said powered airplane between and in contact with said arms so that the leg means of said restraining member blocks movement of said airplane, and permitting said arms to drop to ground level out of the way of said airplane while withdrawing said airplane from contact with said arms.

7. The method of claim 6 wherein said support means comprises a pair of pointed rods for insertion into said ground.

8. The method of claim 7 wherein said parallel arms are provided with sleeves of soft material to prevent damage to said airplane where said arms come into contact with said airplane.

9. The method of claim 8 wherein said restraining member is constructed from a single length of rod-like material bent to form said leg means and said arms.

10. The method of claim 8 wherein said parallel arms have free ends which are hooked to catch said airplane when the tail thereof rises

* * * * *